(12) United States Patent
Martin

(10) Patent No.: US 7,207,061 B2
(45) Date of Patent: Apr. 17, 2007

(54) STATE MACHINE FOR ACCESSING A STEALTH FIREWALL

(75) Inventor: Brian K. Martin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 09/944,996

(22) Filed: Aug. 31, 2001

(65) Prior Publication Data

US 2003/0051155 A1    Mar. 13, 2003

(51) Int. Cl.
*G06F 9/00* (2006.01)
(52) U.S. Cl. .................. 726/11; 726/3; 726/13
(58) Field of Classification Search ........ 713/200–202, 713/151, 153–4; 709/105, 228, 223–225, 709/249–250; 726/1–5, 11–13, 27, 26–30; 380/228, 268, 277–278, 281–285, 28–30
See application file for complete search history.

(56) References Cited

U.S. PATENT DOCUMENTS

| | | | |
|---|---|---|---|
| 5,802,106 A | 9/1998 | Packer ...................... 375/225 |
| 5,941,988 A | 8/1999 | Bhagwat et al. |
| 5,958,053 A | 9/1999 | Denker |
| 5,978,849 A | 11/1999 | Khanna ....................... 709/227 |
| 6,006,264 A | 12/1999 | Colby et al. ................ 709/226 |
| 6,028,919 A * | 2/2000 | Bingel et al. .......... 379/142.13 |
| 6,128,653 A * | 10/2000 | del Val et al. ............... 709/219 |
| 6,163,812 A | 12/2000 | Gopal et al. ................ 709/310 |
| 6,182,226 B1 * | 1/2001 | Reid et al. .................. 713/201 |
| 6,298,386 B1 * | 10/2001 | Vahalia et al. .............. 709/234 |
| 6,321,337 B1 * | 11/2001 | Reshef et al. ............... 713/201 |
| 6,377,948 B2 * | 4/2002 | Kikuchi et al. ............... 707/10 |
| 6,484,203 B1 * | 11/2002 | Porras et al. ............... 709/224 |
| 6,601,175 B1 * | 7/2003 | Arnold et al. .................. 726/7 |
| 6,636,721 B2 * | 10/2003 | Threadgill et al. .......... 455/12.1 |
| 6,678,827 B1 * | 1/2004 | Rothermel et al. ......... 713/201 |
| 6,725,377 B1 * | 4/2004 | Kouznetsov ................ 713/201 |
| 6,795,923 B1 * | 9/2004 | Stern et al. ................. 713/201 |
| 6,799,202 B1 * | 9/2004 | Hankinson et al. ......... 709/219 |
| 6,801,949 B1 * | 10/2004 | Bruck et al. ................ 709/232 |
| 6,868,403 B1 * | 3/2005 | Wiser et al. .................. 705/51 |

(Continued)

OTHER PUBLICATIONS

*Firewalls FAQ*, www.faqs.org/faqs/firewalls-faq, (Jul. 20, 2001) B. Gillespie, *Stealth Firewalls*, Sans Institute, www.sans.org/infosecFAQ/firewall/stealth.htm (Jul. 23, 2001).

*Primary Examiner*—Kim Vu
*Assistant Examiner*—Leynna Ha
(74) *Attorney, Agent, or Firm*—A. Bruce Clay, Esq.; Steven M. Greenberg, Esq.; Carey, Rodriguez, Greenberg & Paul, LLP

(57) ABSTRACT

A stealth firewall. The stealth firewall can include a first network interface to an external network; a second network interface to an internal network; a packet filter for restricting access to the internal network, the packet filter ignoring requests from the external network to access the internal network; and, a state machine. Importantly, the state machine can be pre-configured to transition across one or more internal states conditioned upon receiving particular requests to access the internal network. The state machine further can include at least one state transition reachable through a pre-specified sequence of states which causes the packet filter to permit access to the internal network.

10 Claims, 3 Drawing Sheets

U.S. PATENT DOCUMENTS

| | | | |
|---|---|---|---|
| 6,880,089 B1 * | 4/2005 | Bommareddy et al. | 713/201 |
| 6,928,546 B1 * | 8/2005 | Nanavati et al. | 713/186 |
| 6,988,205 B2 * | 1/2006 | Walker et al. | 713/193 |
| 7,003,560 B1 * | 2/2006 | Mullen et al. | 709/223 |
| 7,007,166 B1 * | 2/2006 | Moskowitz et al. | 713/176 |
| 7,100,201 B2 * | 8/2006 | Izatt | 726/11 |

* cited by examiner

STATE MACHINE FOR ACCESSING A STEALTH FIREWALL

BACKGROUND OF THE INVENTION

1. Technical Field

The present invention relates to remotely accessing hosts through a firewall and more particularly to remotely accessing hosts through a stealth firewall.

2. Related Art

Internet security has increasingly become the focus of both corporate and home computer users who participate in globally accessible computer networks. In particular, with the availability and affordability of broadband Internet access, even within the home, many computers and small computer networks enjoy continuous access to the Internet. Notwithstanding, continuous, high-speed access is not without its price. Specifically, those computers and computer networks which heretofore had remained disconnected from the security risks of the Internet now have become the primary target of malicious Internet hackers, crackers and script kiddies, collectively referred to as "unauthorized intruders".

Notably, many such unauthorized intruders continuously scan the Internet for Internet Protocol (IP)addresses and ports of vulnerable computers communicatively linked to the Internet. At the minimum, those vulnerable computers can experience nuisance damage such as accessed, deleted or modified files or defaced Web pages. Yet, at the other extreme, for the unsuspecting end-user, their computer can become the launch pad for more malicious attacks which can cripple whole segments of the Internet.

In response to this security threat, firewalls have grown in popularity. Firewalls no longer are devices reserved for the sophisticated network administrator. Rather, firewall manufacturers now distribute personal firewalls both in hardware and software form. In fact, personal firewalls also have been integrated into many personal routers marketed to the home consumer. The term, "firewall", connotes many types of devices. Two particular devices commonly associated with the term, "firewall", include the application proxy and the packet filtering gateway.

While application proxies are widely considered to be more secure than packet filtering gateways, their restrictive nature and performance limitations have hindered their adoption. As a result, application proxies largely are deployed in order to limit the type of data traffic emerging from a protected network rather than the type of data entering into a protected network. Packet filtering gateways, by comparison, are often deployed in those networks in which incoming data is a concern and in which data throughput is an important criteria.

Packet filtering gateways operate by intercepting incoming data packets destined for a device in a protected network. Upon intercepting an incoming packet, the packet filtering gateway can determine whether a request to transmit data to the device is a permissible request. More particularly, the packet filtering gateway can identify in the request a destination IP address and a selected port. If the transaction is permissible, the packet filtering gateway will notify the requesting device accordingly by transmitting an "acknowledgment" (ACK) signal and engaging in a process known in the art as a "three-way handshake ". In contrast, if the transaction is not permissible, the packet filtering gateway will notify the requesting device accordingly by sending a "reset" (RST) signal.

FIG. 1A is a schematic illustration of a conventional firewall architecture in which requests (SYN) 100A to access the protected network 120A are transmitted from a device 130A over the Internet 140A. The network requests 100A are either granted or denied by the firewall 110A in a response 150A based upon associated packet filtering rules. If granted, an ACK signal is transmitted to the device 130A. Conversely, if denied, an RST message is transmitted to the device 130B. Notably, firewall 110A can be a "stateful" firewall whose packet filtering rules can be applied to a history of received access requests 100A.

A stateful firewall performs packet filtering not on the basis of a single packet, but on the basis of some historical window of packets on the same port. Although stateful inspection may enhance the level of security achievable using packet filtering, stateful inspection heretofore is a relatively unproven technology. Furthermore, although a historical window of packets may enable the filter to more accurately identify harmful packets, the filter must still know what type of pattern to look for in order to identify an intruder. Developing a stateful packet filter with sufficient intelligence to handle an almost infinite variety of possible packets and packet sequences has proven to be an exceedingly difficult task.

There are well-known deficiencies associated with those firewalls as illustrated in FIG. 1A. Specifically, an unauthorized intruder probing a protected network can identify open ports in a network simply by progressively scanning each port in the target network. If the port is "open", the firewall will report the port as such. Even if the firewall denies access to the scanned port, however, the very fact that the firewall denied the request can indicate to the unauthorized intruder that a firewall is present. In this way, the unauthorized intruder can target the firewall using well-known methods to determine its manufacturer, model name and model number. Once the manufacturer, model name and model number of the firewall has become known to the unauthorized intruder, documented security flaws in the firewall can be exploited. Hence, it is preferable that a firewall remain difficult to detect when present in a network.

Stealth firewalls have characteristics that inhibit their detection in a network. As illustrated in the schematic diagram of FIG. 1B, a stealth firewall 110B has the characteristic of ignoring a SYN request 100B rather than providing an ACK or RST message in response to the SYN request 100B. By ignoring particular inbound SYN requests, though in violation of the TCP/IP protocol, an impression is created that the firewall and the network behind the firewall does not exist at the I P address associated with the access request.

Still, there are many reasons why remote access from a previously unspecified network location to a device in a protected network would be desirable. For example, it can be helpful for a remote user to access a home network to monitor the status of an alarm system, or to access a video camera in the home. A suitably fielded stealth firewall, however, would block such attempts at establishing a connection.

SUMMARY OF THE INVENTION

The present invention addresses the deficiencies of the prior art by providing a stealth firewall which, based upon a sequence of access requests received from a network device across a network, can grant access to a protected network while otherwise ignoring all access requests in those sequences which do not comport with a predetermined sequence. Specifically, tantamount to a digital combination lock, a stealth firewall which has been suitably configured can examine parameters in each access request to identify a portion of a code sequence or an authenticating packet. When a pre-specified sequence of parameters or the authenticating packet has been received from a network device within a pre-specified period, access to the protected network can be granted to the requesting network device.

A stealth firewall which has been configured in accordance with the inventive arrangements can include a first network interface to an external network, a second network interface to an internal network, a packet filter for restricting access to the internal network, and a state machine pre-configured to transition across multiple internal states, from a restricting state to an access state. Notably, the packet filter will not respond to the external network upon receiving requests from the external network to access the internal network. Notwithstanding, the packet filter can permit access to the internal network upon receiving a plurality of requests which collectively form a code for causing the state machine to transition from the restricting state to the access state.

Notably, in one aspect of the present invention, requests from the external network can include TCP SYN messages. In this aspect of the invention, each state in the state machine can correspond to data in a specified field of the TCP SYN message. In particular, the specified field can include a destination port field in the TCP SYN message. As such, the packet filter can permit access to a specific port in the internal network based upon a destination port specified in a TCP SYN message received after the state machine has transitioned to a final state. Finally, in yet another aspect of the present invention, the code can include a rolling code which can vary according to time.

A method for permitting access to a network protected behind a stealth firewall can include first initializing a state machine which has been configured to grant access to the stealth firewall contingent upon the state machine transitioning through one or more states based upon access request parameters identified in received access requests from a single network device. Once initialized, the stealth firewall can receive access requests from a network device in a network which is external to the network protected behind the stealth firewall. Importantly, each the stealth firewall need not respond to each access request received from the network device.

Each time an access request is received from a network device, an access parameter can be identified in the access request. Subsequently, the state machine can transition from an initial state in the state machine to an intermediate state if the identified access request satisfies transitioning criteria associated with the state machine for transitioning from the initial state to the intermediate state. At a later time, a further access request can be received from the network device in the network which is external to the network protected behind the stealth firewall.

Upon receiving the further access request, a further access parameter can be identified in the further access request and the state machine can transition from an intermediate state in the state machine to a final state if the identified further access request satisfies transitioning criteria associated with the state machine for transitioning from an intermediate state to the final state. Significantly, when the state machine transitions to the final state, the stealth firewall can permit the network device to access the network protected behind the stealth firewall.

In a further aspect of the invention, a method for permitting access to a network protected behind a stealth firewall can include receiving multiple access requests from multiple network devices which are external to the network protected behind the stealth firewall. The stealth firewall does not respond to the multiple network devices upon receipt of the access requests, however, access request parameters can be identified therein.

When selected ones of the access requests are received and particular access parameters are identified therein, state transitions are performed in a state machine in the stealth firewall. More particularly, sequences of identified access request parameters can cause a corresponding sequence of state transitions in the state machine. Upon identifying a pre-determined sequence of access request parameters, the stealth firewall can permit access to a selected network device responsible for transmitting a sequence of access requests which contained the identified sequence of access requests parameters.

In yet a further aspect of the invention, a method for permitting access to a network protected behind a stealth firewall can include configuring a state machine to grant access to the stealth firewall contingent upon the state machine transitioning through a plurality of states based upon a sequence of access request parameters identified in received access requests from a single network device. A sequence of access parameters can be set to a specific set of access parameters. Finally, the state machine can be disposed in the stealth firewall.

In yet a further aspect of the invention, a method for permitting access to a network protected behind a stealth firewall can include configuring a state machine to grant access through the stealth based upon the reception of a single authentication packet. Notably, the single authentication packet can include a hashed shared secret along with a timestamp. Additionally, the single authentication packet can be transmitted in a connectionless manner using the UDP transport protocol.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a stealth firewall through which a connection can be remotely established by an authorized user based upon the authorized user providing a series of access requests which satisfy criteria specified in an internal state machine. Specifically, a firewall for controlling access to a protected network which has been configured in accordance with the inventive arrangements can include a state machine which includes two or more states. The state machine can transition from one state to the next based upon the identification of particular access parameters included in received access requests.

As in the case of conventional stealth firewalls, the stealth firewall of the present invention can ignore individual access requests. Upon receiving a sequence of access requests from an individual network device which satisfies pre-programmed criteria, however, the state machine can transition through a series of states, from an initial state to a final state in which access can be granted to the protected network. Hence, the stealth firewall essentially includes an "electronic combination lock" whose combination can be specified in access parameters in a sequence of access requests.

Figure 1A:
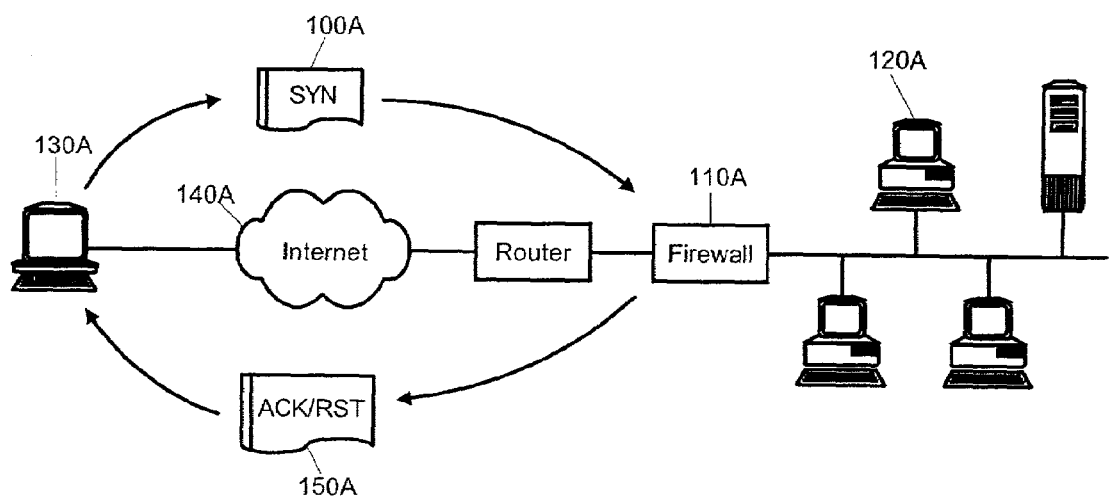
FIG. 1A is a schematic illustration of a conventional firewall architecture previously known in the art.
Figure 1B:
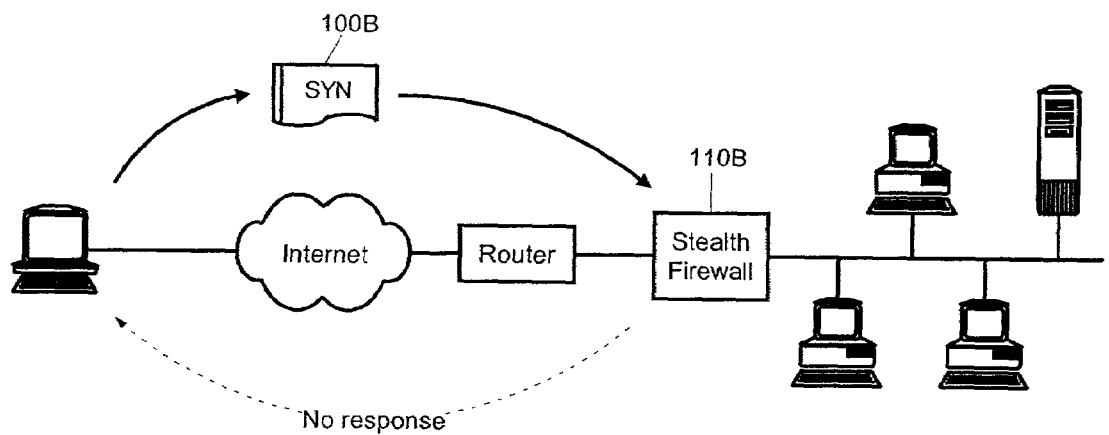
FIG. 1B is a schematic illustration of a conventional stealth firewall architecture previously known in the art.
Figure 2:
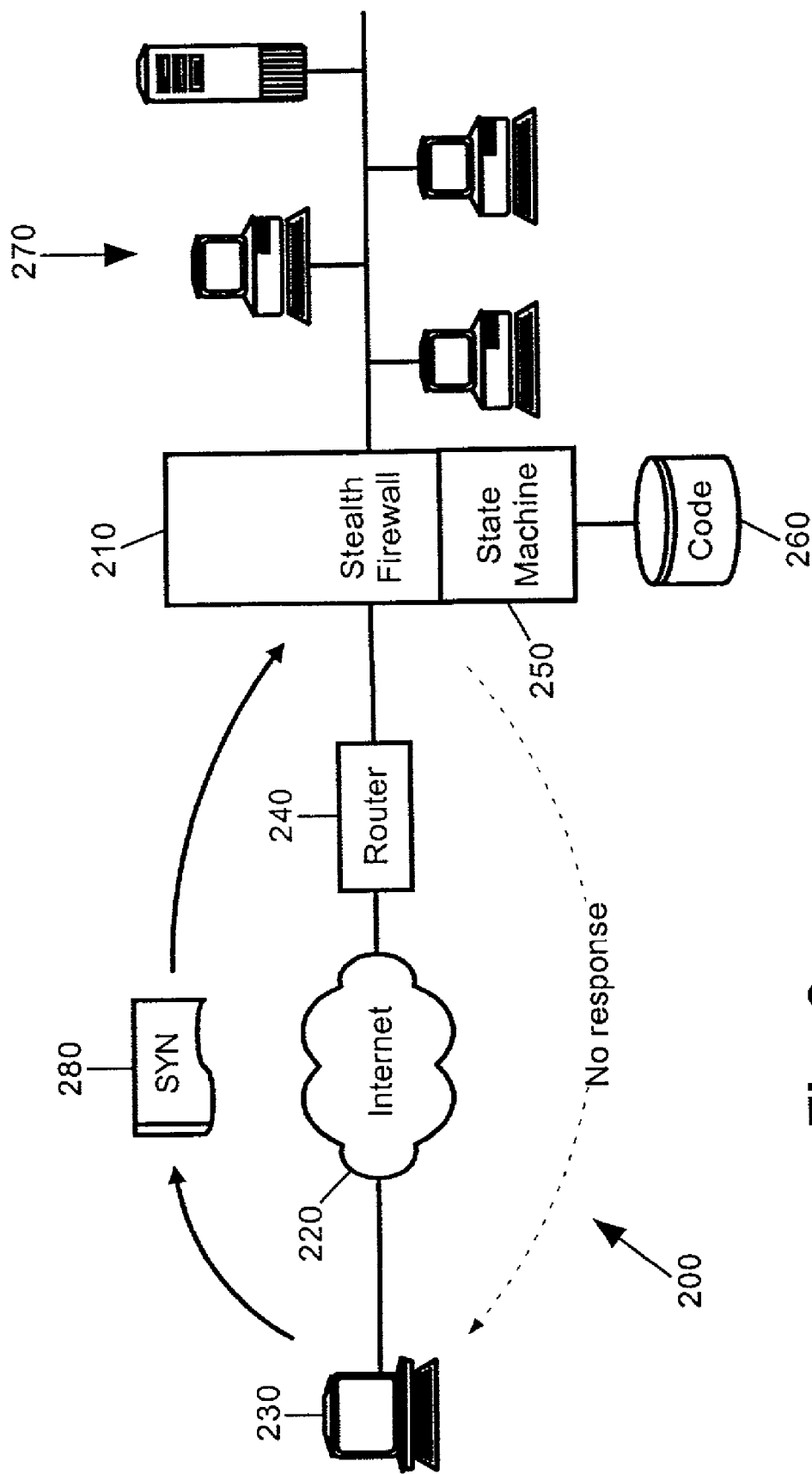
FIG. 2 is a schematic illustration of a stealth firewall architecture which has been configured with a state machine in accordance with the inventive arrangements.

FIG. 2 is a schematic illustration of a global computer communications network 200 which has been configured with a stealth firewall 210 in accordance with the inventive arrangements. The global computer communications network 200 can include a plurality of network devices in a plurality of local and regional networks, each local and regional network interconnected through the use of switching technology well-known in the art. Though only a single regional network 220, switching device 240 and network device 230 have been illustrated for purposes of simplicity, one skilled in the art will recognize that the global computer communications network 200 illustrated in FIG. 2 merely is representative of more realistic network topologies such as the Internet in which multiple local and regional networks, network devices and firewalls are interconnected in a global network of networks.

As shown in FIG. 2, a stealth firewall 210 controls access to a protected network 270 by utilizing packet filtering algorithms presently deployed in the art. In the absence of the stealth firewall 210, the network device 230 which is external to the protected network 270 can request and establish communicative connections with services residing in devices in the protected network using well known communications protocols such as TCP/IP and the like. In the case of TCP/IP, these network access requests 280 can be TCP SYN requests and can include a source and destination network address, and a specified port on which requested services "listen". The requests 280 can be communicated over the regional network 220 and routed to a suitable destination device in the protected network 270 using router 240.

The inclusion of the stealth firewall 210, however, restricts the source, destination and type of access requests which are granted to network devices which are external to the protected network 270. Specifically, the stealth firewall 210 can be programmed to ignore access requests (as opposed to a conventional firewall's rejection of access requests) which originate from specified network devices. Additionally, the stealth firewall 210 can be programmed to ignore access requests which are directed to specified devices in the protected network 270. Finally, the stealth firewall 210 can be programmed to ignore access requests for particular ports specified in the access requests.

Significantly, in accordance with the inventive arrangements, a state machine 250 can be included in the stealth firewall 210. The state machine 250 can be pre-programmed with an access code 260. Specifically, the state machine 250 can transition from state to state based upon parameters identified in a received access request 280 which match portions of the access code 260. For instance, the stealth firewall 210 can identify in the access request 280 a requested port on which the requesting network device 230 desires to open a connection.

Based upon the value of the requested port, the state machine 250 either can transition to a next, intermediate state if the value matches a portion of the access code 260, or the state machine can reset to the initial state if the value does not match any portion of the access code 260. Notably, the access code 260 needn't be a static access code. Rather, in one aspect of the invention, the access code 260 can be a rolling access code analogous to the rolling access codes used to activate garage doors with garage door remote openers.

Figure 3A:
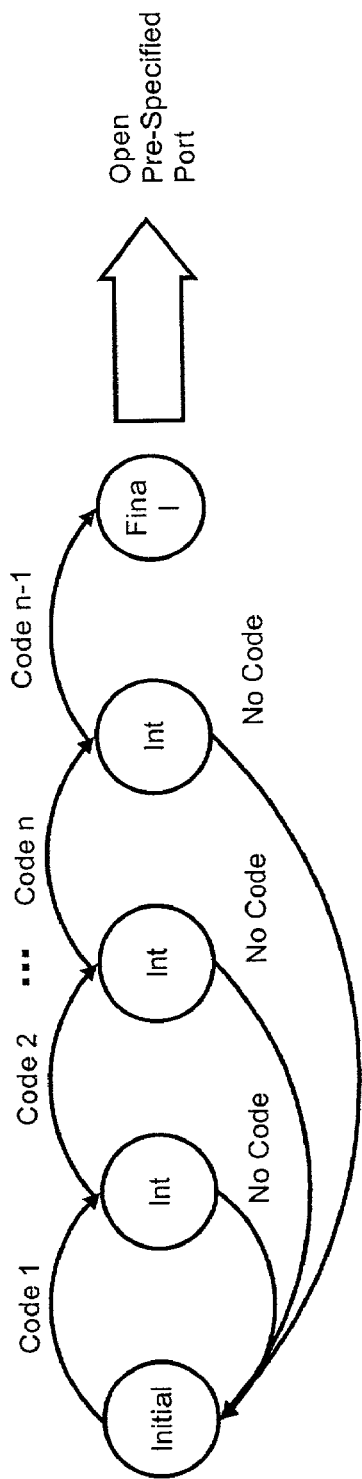
FIG. 3A is a state machine diagram illustrating a state machine for providing access to a stealth firewall in accordance with a first aspect of the inventive arrangements; and, FIG. 3B is a state machine diagram illustrating a state machine for providing access to a stealth firewall in accordance with a first aspect of the inventive arrangements.

An exemplary state machine is shown in FIG. 3A. In FIG. 3A the state machine is initialized at startup to an initial state. If an identified parameter in a received network request includes the value symbolized by "Code 1", the state machine can transition to the next, intermediate state. If an identified parameter in the received network request does not include the value symbolized by "Code 1", the state machine can remain in the initial state.

Correspondingly, for each intermediate state, if an identified parameter in a subsequently received network request includes the value symbolized by the associated code, e.g. Code n-1, the state machine can transition to the next intermediate state. Otherwise, the state machine can return to an initial state. Ultimately, when the state machine transitions to the final state, a pre-specified port can be opened. Hence, the state machine behaves analogously to a combination lock wherein the combination is comprised of the various values represented by Code 1, Code 2, . . . , Code n-1, Code n.

Importantly, in one particular aspect of the invention, a state machine can be created for each network device requesting access to a device in the protected network. However, in a less complex system, the state machine can exist for all network devices requesting access to the protected network. In the latter case, the timing of transmission of the sequence of access requests can be particularly important so as to ensure that a sequence of access requests received in the firewall corresponds to a single network device.

Notably, as it is well known in the art, in a protocol stack configured in accordance with TCP/IP, when a network device attempts transmission of a SYN request to another network device, if neither an ACK nor a RST is received, the SYN request can be re-transmitted. In this case, additional state information can be maintained in the firewall to identify and discard the redundant SYN requests. Alternatively, access requests intended to "unlock" the firewall can be generated outside of the TCP/IP stack.

An example of the operation of the state machine in the firewall follows. First, the state machine can be configured with an access code sequence having the values 0x0001, 0x0002, 0x0003, 0x0004. The state machine further can be configured to trigger the opening of port 0x0080 upon transitioning from a fourth intermediate state to a fifth final state. In this scenario, once the firewall has been initialized, the following sequence can occur:

```
CLIENT (216.157.1.1)           FIREWALL        TARGET HOST
SYN (Dest port: 0x0001)------>
SYN (Dest port: 0x0002)------>
SYN (Dest port: 0x0003)------>
SYN (Dest port: 0x0004)------>
<FIREWALL AUTHENTICATES CLIENT AT 216.157.1.1>
                                     SYN(Dest port:80)----->
                                     <------------------ACK
```

Figure 3B:
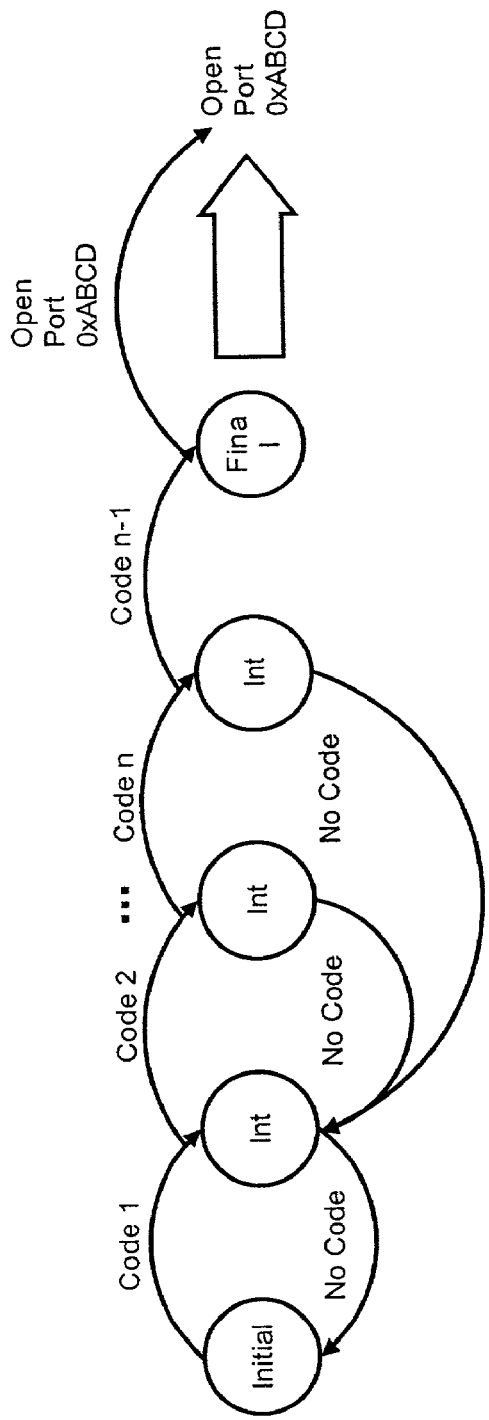

FIG. 3B is a state diagram illustrating an alternative aspect of the invention. In the alternative aspect, a network device, upon authentication, can specify a particular port to open. Specifically, assuming that the network device can transmit a sequence of access requests having associated parameters which comport with the stored access code, the firewall upon authenticating the network device can receive yet another access request specifying the desired port. The firewall, in turn, can forward the access request to the desired network device which can acknowledge the access request.

The following example is illustrative of the alternative aspect of the invention:

```
CLIENT (216.157.1.1)          FIREWALL        TARGET HOST
SYN (Dest port: 0x0001)------>
SYN (Dest port: 0x0002)------>
SYN (Dest port: 0x0003)------>
SYN (Dest port: 0x0004)------>
<FIREWALL AUTHENTICATES CLIENT AT 216.157.1.1>
SYN (Dest port: xxxxxxx)----->
                              SYN(Dest port:xxxxxx)--->
                              <------------------ACK
```

In yet further aspect of the invention, instead of identifying a portion of a code sequence, the method the invention can permit access to a network protected behind a stealth firewall through the identification and authentication of a single authentication packet. In particular, the single authentication packet can include a hashed shared secret along with a timestamp. Additionally, the single authentication packet can be transmitted in a connectionless manner using the UDP transport protocol.

For example, an authenticating user's password known both to the firewall and the user, in addition to a timestamp, can be encoded by a hashing algorithm such as MD5. Alternatively, the password and timestamp can be encoded wherein the timestamp can be transmitted nakedly along with a hashed password. In any case, upon reception of the time stamp and password, the stealth firewall can decode the combined timestamp and hashed password.

Once the password has been received in hashed form, the stealth firewall can pass the known password through the same hashing algorithm along with the timestamp. If the hashing algorithm produces a result which matches the transmitted hash value, access can be permitted through the stealth firewall. Importantly, the stealth firewall can validate the timestamp as falling within a specified limit. Furthermore, the stealth firewall can ensure that the authentication token is not reused.

The present invention can be realized in hardware, software, or a combination of hardware and software. A stateful stealth firewall which has been configured in accordance with the present invention can be realized in a centralized fashion in one computer system, or in a distributed fashion where different elements are spread across several interconnected computer systems. Any kind of computer system, or other apparatus adapted for carrying out the methods described herein, is suited.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A stealth firewall comprising:
a first network interface to an external network;
a second network interface to an internal network;
a packet filter for restricting access to said internal network; and,
a state machine pre-configured to transition across a plurality of internal states, from a restricting state to an access state, conditioned upon receiving a plurality of requests to access said internal network, said plurality of requests collectively comprising a code for causing said state machine to transition from said restricting state to said access state which causes said packet filter to permit access to said internal network, wherein
said packet filter not responding to said external network upon receiving any request from said external network to access said internal network when said state machine in said restricting state.

2. The stealth firewall of claim 1, wherein said requests from said external network comprise transport control protocol (TCP) SYN messages.

3. The stealth firewall of claim 2, wherein each state in said state machine corresponds to data in a specified field of said TCP SYN messages.

4. The stealth firewall of claim 3, wherein said specified field comprises a destination port field.

5. The stealth firewall of claim 1, wherein said code is a rolling code which can vary according to time.

6. The stealth firewall of claim 2, wherein said packet filter can permit access to a specific port in said internal network based upon a destination port specified in a TCP SYN message received after transitioning to said access state in said state machine.

7. A method for permitting access to a network protected behind a stealth firewall comprising the steps of:
initializing a state machine configured to grant access to the stealth firewall contingent upon said state machine transitioning across a plurality of internal states responsive to receiving a plurality of requests to access the network from a single network device, said plurality of requests collectively comprising a code for causing said state machine to permit access to the network;
receiving an access request from a network device in a network which is external to the network protected behind the stealth firewall, identifying an access parameter in said access request and transitioning from an initial state in said state machine to an intermediate state if said identified access request satisfies transitioning criteria associated with said state machine for transitioning from said initial state to said intermediate state;

receiving a further access request from said network device in said network which is external to the network protected behind the stealth firewall, identifying a further access parameter in said further access request and transitioning from an intermediate state in said state machine to a final state if said identified further access request satisfies transitioning criteria associated with said state machine for transitioning from an intermediate state to said final state;

not providing a response to said network device upon receiving each said access request from said network device in said network which is external to the network protected behind the stealth firewall unless said network device provides a sequence of access requests to the stealth firewall causing said state machine to transition to said final state; and, upon transitioning to said final state, permitting said network device to access the network protected behind the stealth firewall.

8. A method for permitting access to a network protected behind a stealth firewall comprising the steps of:

receiving a plurality of access requests from a plurality of network devices which are external to the network protected behind the stealth firewall;

not providing a response to said plurality of network device upon receiving each of said access requests;

identifying access request parameters in said received access requests;

performing state transitions in a state machine in the stealth firewall based upon identifying particular ones of said identified access request parameters; and, upon identifying a pre-determined sequence of access request parameters, said identification of said sequence of access request parameters causing a corresponding sequence of state transitions in the said machine, permitting access to a selected network device responsible for transmitting said sequence of access requests parameters.

9. A machine readable storage having stored thereon a computer program for permitting access to a network protected behind a stealth firewall, said computer program comprising a routine set of instructions for performing the steps of:

initializing a state machine configured to grant access to the stealth firewall contingent upon said state machine transitioning across a plurality of internal states responsive to receiving a plurality of requests to access the network from a single network device, said plurality of requests collectively comprising a code for causing said state machine to permit access to the network;

receiving an access request from a network device in a network which is external to the network protected behind the stealth firewall, identifying an access parameter in said access request and transitioning from an initial state in said state machine to an intermediate state if said identified access request satisfies transitioning criteria associated with said state machine for transitioning from said initial state to said intermediate state;

receiving a further access request from said network device in said network which is external to the network protected behind the stealth firewall, identifying a further access parameter in said further access request and transitioning from an intermediate state in said state machine to a final state if said identified further access request satisfies transitioning criteria associated with said state machine for transitioning from an intermediate state to said final state;

not providing a response to said network device upon receiving each said access request from said network device in said network which is external to the network protected behind the stealth firewall unless said network device provides a sequence of access requests to the stealth firewall causing said state machine to transition to said final state; and, upon transitioning to said final state, permitting said network device to access the network protected behind the stealth firewall.

10. A machine readable storage having stored thereon a computer program for permitting access to a network protected behind a stealth firewall, said computer program comprising a routine set of instructions for performing the steps of:

receiving a plurality of access requests from a plurality of network devices which are external to the network protected behind the stealth firewall;

not providing a response to said plurality of network device upon receiving each of said access requests;

identifying access request parameters in said received access requests;

performing state transitions in a state machine in the stealth firewall based upon identifying particular ones of said identified access request parameters; and, upon identifying a pre-determined sequence of access request parameters, said identification of said sequence of access request parameters causing a corresponding sequence of state transitions in the said machine, permitting access to a selected network device responsible for transmitting said sequence of access requests parameters.

* * * * *